US010255937B1

(12) United States Patent
Kunkel et al.

(10) Patent No.: US 10,255,937 B1
(45) Date of Patent: Apr. 9, 2019

(54) ELECTRICALLY CONDUCTIVE OVERLAY FOR HEAD-MEDIUM CONTACT SENSOR

(71) Applicant: Seagate Technology LLC, Cupertino, CA (US)

(72) Inventors: Gary Joseph Kunkel, Minneapolis, MN (US); Jin Fang, Chaska, MN (US); Erik J. Hutchinson, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 2 days.

(21) Appl. No.: 15/484,261

(22) Filed: Apr. 11, 2017

Related U.S. Application Data

(60) Provisional application No. 62/320,993, filed on Apr. 11, 2016.

(51) Int. Cl.
*G11B 5/60* (2006.01)
*G11B 5/48* (2006.01)
*G11B 5/00* (2006.01)

(52) U.S. Cl.
CPC .......... *G11B 5/6076* (2013.01); *G11B 5/4853* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,176,005 B1* | 1/2001 | Garfunkel et al. | .. | G11B 5/3903 29/603.14 |
| 6,493,194 B1* | 12/2002 | Sakaguchi et al. | .. | G11B 5/3903 360/322 |
| 6,934,129 B1* | 8/2005 | Zhang et al. | ........ | G11B 5/3932 360/322 |
| 6,989,972 B1* | 1/2006 | Stoev et al. | ......... | G11B 5/3932 360/322 |
| 8,542,456 B2 | 9/2013 | Yamane et al. | | |
| 2001/0001256 A1* | 5/2001 | Hsiao | .................... | G11B 5/3116 360/318 |
| 2001/0004306 A1* | 6/2001 | Lee et al. | ............. | G11B 5/3967 360/313 |
| 2001/0026424 A1* | 10/2001 | Kamata et al. | ...... | G11B 5/3903 360/322 |
| 2002/0093773 A1* | 7/2002 | Pinarbasi | ............. | G11B 5/3903 360/322 |
| 2003/0053265 A1* | 3/2003 | Terunuma et al. | .. | G11B 5/3903 360/322 |

(Continued)

*Primary Examiner* — Craig A. Renner
(74) *Attorney, Agent, or Firm* — Hollingsworth Davis, LLC

(57) ABSTRACT

A contact sensor is provided at or near an air bearing surface of a slider and having a temperature coefficient of resistance. The contact sensor is coupled to a lead arrangement comprising a first lead and a second lead. The contact sensor comprises a sensor element, a first peripheral wing comprising an inner wing connected to the sensor element and an outer wing connected to the first lead, and a second peripheral wing comprising an inner wing connected to the sensor element and an outer wing connected to the second lead. An electrically conductive overlay covers at least the outer wings of the first and second peripheral wings and some or all of the first and second electrical leads.

23 Claims, 12 Drawing Sheets

(56) References Cited

U.S. PATENT DOCUMENTS

| | | | |
|---|---|---|---|
| 2003/0214761 A1* | 11/2003 | Freitag et al. | G11B 5/3903 360/322 |
| 2004/0057163 A1* | 3/2004 | Lin | G11B 5/332 360/322 |
| 2006/0056112 A1* | 3/2006 | Arasawa et al. | G11B 5/3903 360/322 |
| 2008/0112092 A1 | 5/2008 | Fontana et al. | |
| 2012/0120519 A1 | 5/2012 | Kunkel et al. | |
| 2012/0120522 A1 | 5/2012 | Johnson et al. | |
| 2012/0120527 A1 | 5/2012 | Kunkel et al. | |
| 2012/0120982 A1 | 5/2012 | Anaya-Dufresne et al. | |

* cited by examiner

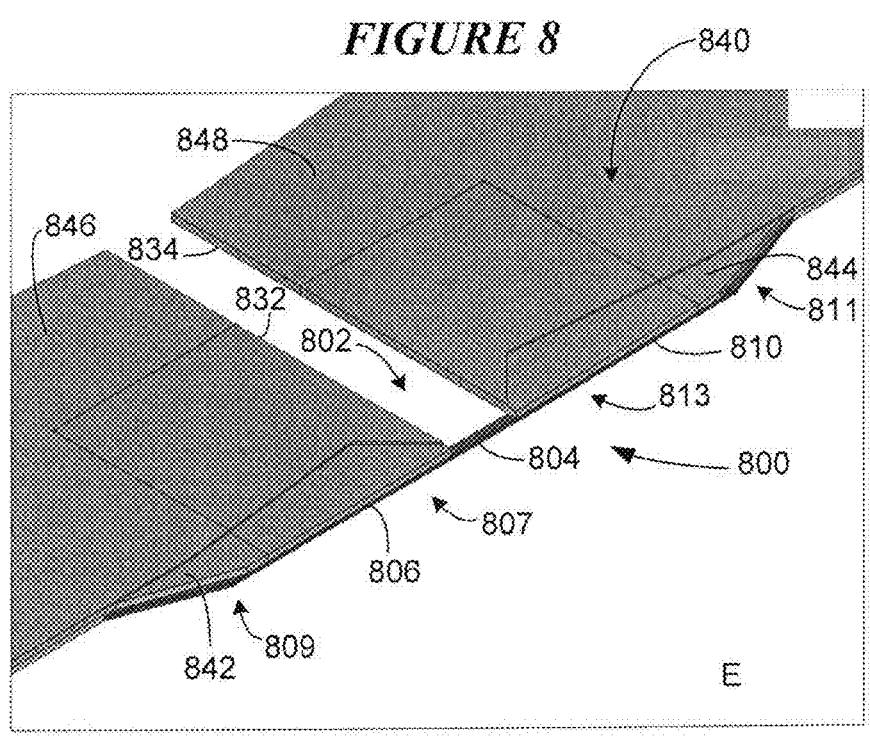

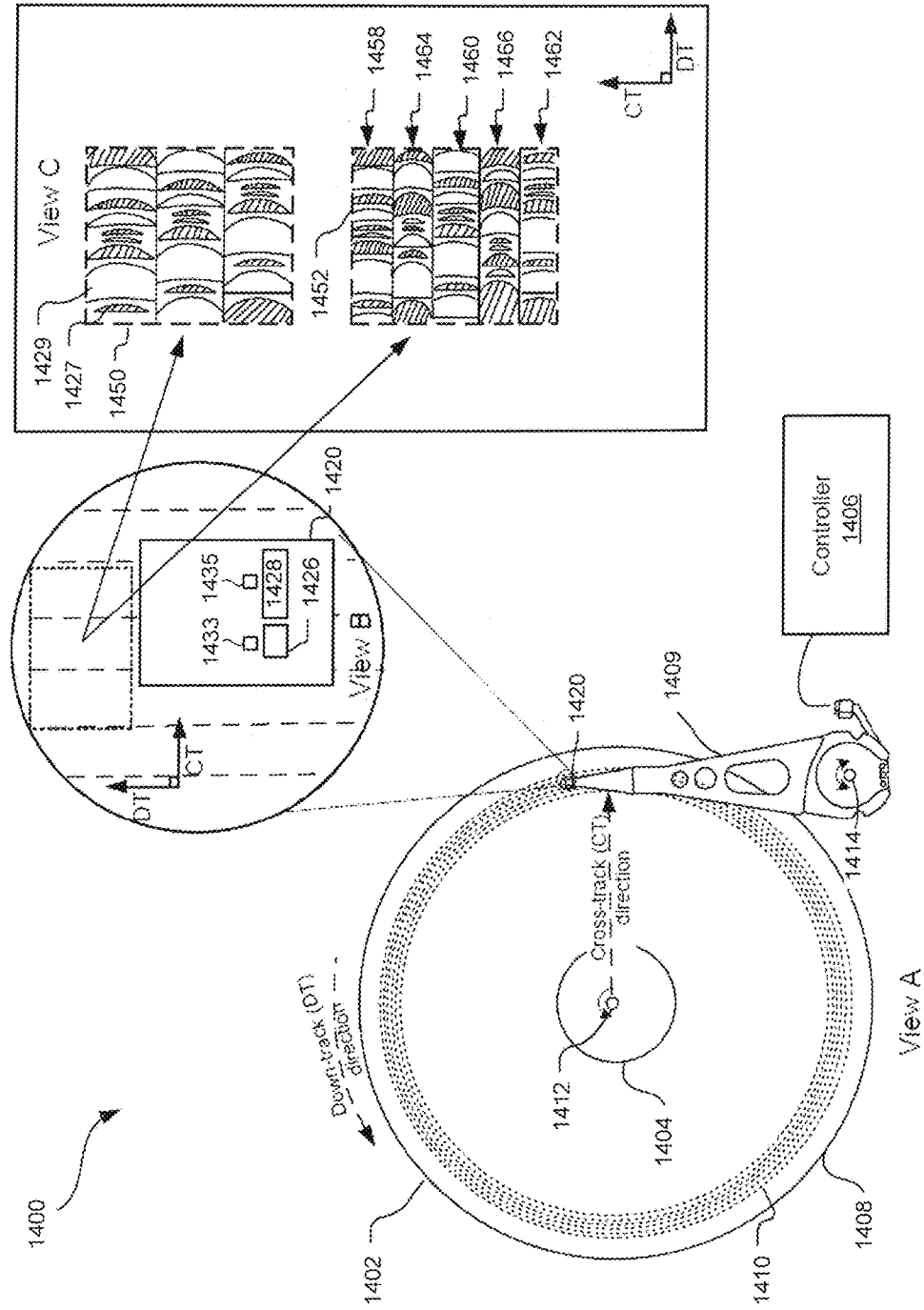

ELECTRICALLY CONDUCTIVE OVERLAY FOR HEAD-MEDIUM CONTACT SENSOR

RELATED PATENT DOCUMENTS

This application claims the benefit of Provisional Patent Application Ser. No. 62/320,993 filed on Apr. 11, 2016, to which priority is claimed pursuant to 35 U.S.C. § 119(e), and which is incorporated herein by reference in its entirety.

SUMMARY

Embodiments of the disclosure are directed to an apparatus comprising a contact sensor provided at or near an air bearing surface of a slider and having a temperature coefficient of resistance. The contact sensor comprises a sensor element disposed between a pair of peripheral wings. The peripheral wings have a cross-sectional area larger than that of the sensor element. Electrically conductive leads are connected to the peripheral wings. The leads have a cross-sectional area larger than that of the peripheral wings. An electrically conductive overlay covers a portion of the peripheral wings and at least a portion of the leads.

Other embodiments are directed to an apparatus comprising a contact sensor provided at or near an air bearing surface of a slider and having a temperature coefficient of resistance. The contact sensor is coupled to a lead arrangement comprising a first lead and a second lead. The contact sensor comprises a sensor element, a first peripheral wing comprising an inner wing connected to the sensor element and an outer wing connected to the first lead, and a second peripheral wing comprising an inner wing connected to the sensor element and an outer wing connected to the second lead. An electrically conductive overlay covers at least the outer wings of the first and second peripheral wings and some or all of the first and second electrical leads.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 8 illustrates a contact sensor circuit which includes an electrically conductive overlay in accordance with various embodiments;

FIG. 14 illustrates a data storage device configured for interlaced magnetic recording with recording heads that incorporate a multiplicity of contact sensors with electrically conductive overlays in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments of the disclosure are directed to a contact sensor with reduced parasitic resistance and an increased SNR. Various contact sensors disclosed herein can be configured to sense for one or more of thermal asperities, head-medium spacing, head-medium contact, voids of a magnetic recording medium, and head temperature. Contact sensors of the present disclosure can be implemented in a variety of data storage systems, including those configured for conventional perpendicular magnetic recording, those configured for heat-assisted magnetic recording (HAMR), and those configured for interlaced magnetic recording (IMR), for example.

Figure 1:
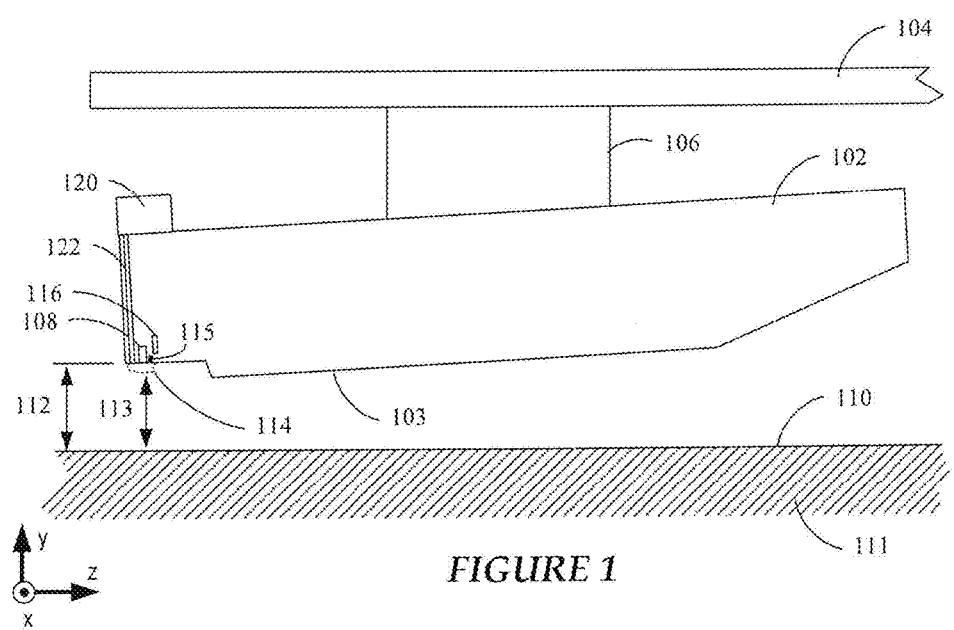
FIG. 1 is a schematic representation of a slider in which the various embodiments disclosed herein may be implemented.

Referring now to FIG. 1, a block diagram shows a side view of a slider 102 according to a representative embodiment. The slider 102 may be used in a magnetic data storage device, e.g., a hard disk drive. The slider 102 may also be referred to as a read/write head or transducer, recording head or transducer, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 shown in FIG. 1 is configured as a HAMR recording head, which includes a laser 120 (or other energy source) and a waveguide 122. The waveguide 122 delivers light from the laser 120 to components (e.g., a near-field transducer) near the read/write transducers 108. It is understood that embodiments of the disclosure can be implemented in conventional head configurations (e.g., for conventional perpendicular magnetic recording), and are not limited to HAMR devices.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write transducers 108 and the magnetic recording medium 111, and generally defines the head-to-medium spacing 113. To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116.

A contact sensor 115 is shown situated at or near the close point 114 (e.g., adjacent the read/write transducers 108, such as near the near-field transducer) or can be positioned at other location of the ABS 103. It is noted that in some embodiments, the contact sensor 115 can be located off the air bearing surface inside the slider. Although a single contact sensor 115 is shown in FIG. 1, the slider 102 can incorporate several contact sensors 115 situated at different close points of the slider 102. In some embodiments, a slider 102 can incorporate a multiplicity of read heads, such as in TDMR (Two Dimensional Magnetic Recording) and MSMR (Multi-sensor Magnetic Recording) devices. In other embodiments, such as that illustrated in FIG. 15, a slider 102 can incorporate a multiplicity of write heads (e.g., a wide write head and a narrow write head), such as in an IMR device. A contact sensor 115 can be located proximate the close point of each read head and/or each write head in such devices. In some configurations, multiple contact sensors 115 can controlled independently. In other configurations, multiple contact sensors 115 can be coupled together.

Figure 2:
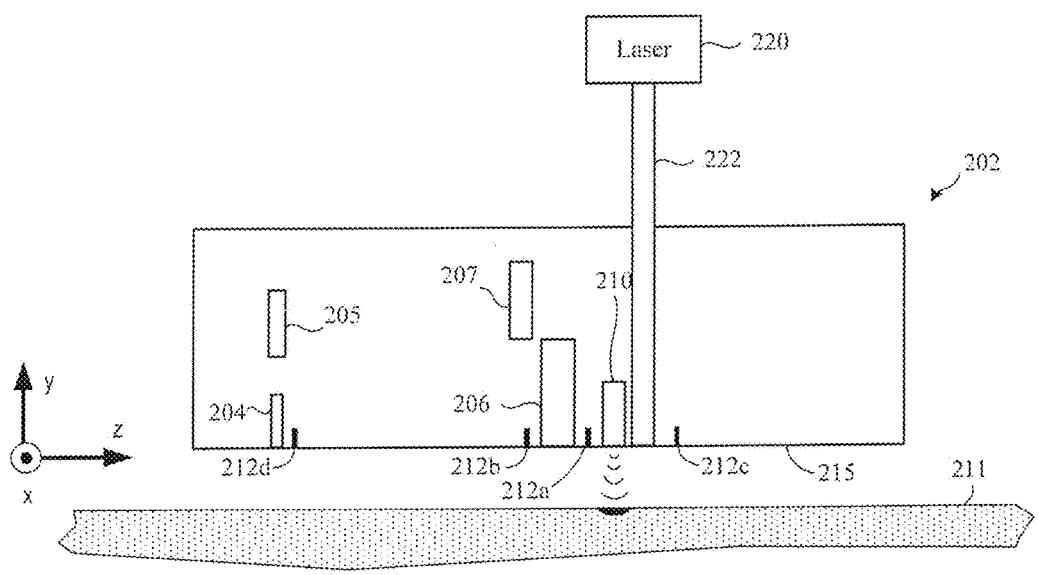
FIG. 2 shows a recording head arrangement in accordance with various embodiments.

FIG. 2 shows a recording head arrangement 200 in accordance with various embodiments. More particularly, the recording head arrangement 200 is configured as a HAMR device. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211.

FIG. 2 further shows a contact sensor situated at various locations on the slider 202 at or near the ABS 215. In some embodiments, a contact sensor 212a can be situated adjacent the NFT 210 (e.g., between the NFT 210 and the write pole of the writer 206). In other embodiments, a contact sensor 212b can be situated adjacent the write pole of the writer 206 on the side opposite that nearest the NFT 210. In further embodiments, a contact sensor 212c can be situated adjacent the waveguide 222 on the side opposite that nearest the NFT 210. Yet in other embodiments, a contact sensor 212d can be situated adjacent the reader 204. It is understood that a single or multiple contact sensors may be provided/distributed on the slider 202. The contact sensor 212a-d can have a width of between about 0.5 and 10 µm, such as about 1.5 µm. Various embodiments disclosed herein are directed to contact sensors having a temperature coefficient of resistance (referred to herein as TCR sensors, such as a differential-ended TCR sensor or DETCR). A DETCR sensor is configured to operate with each of its two electrical contacts or leads (ends) connected to respective bias sources provided by a pair of electrical bond pads of the slider 202. Another example of a TCR sensor is a ground-split (GS) temperature coefficient of resistance sensor, in which one end of the GSTCR is coupled to ground and the other is coupled to a bias source via an electrical bond pad of the slider 202.

Performance of a contact sensor, such as a DETCR sensor, can suffer due to parasitic resistance of the contact sensor circuit. The term parasitic resistance in the context of a contact sensor refers to the resistance in the contact sensor circuit that is not part of the active sensor element (e.g., sensor wire). The contact sensor circuit typically includes the contact sensor, the leads connected to the contact sensor, and any vias, connections, and bond pads coupled to the leads. In general terms, an increase in parasitic resistance of a contact sensor circuit results in a reduction in contact sensor signal-to-noise ratio (SNR). Conversely, decreasing the contact sensor and/or contact sensor circuit parasitic resistance can provide for improved contact sensor performance (e.g., higher SNR).

Embodiments of the disclosure are directed to a contact sensor with reduced parasitic resistance and an increased SNR. Embodiments are directed to a contact sensor that incorporates a conductive overlay or overlays that serve to reduce parasitic resistance of the contact sensor circuit. For example, a conductive overlay(s) can be applied to a contact sensor circuit to increase the effective cross-sectional area of the leads, thereby decreasing the lead parasitic resistance. As will be discussed in detail hereinbelow, indiscriminant provision of the conductive overlay(s) on the contact sensor circuit can cause a reduction (rather than an increase) in contact sensor performance (SNR) due to excessive heat sinking of the sensor element. As such, embodiments of the disclosure are directed to a contact sensor circuit arrangement with a conductive overlay(s) that serves to reduce both parasitic resistance of the contact sensor circuit and to reduce heat transfer from the active sensor element of the circuit during operation.

Figure 3:
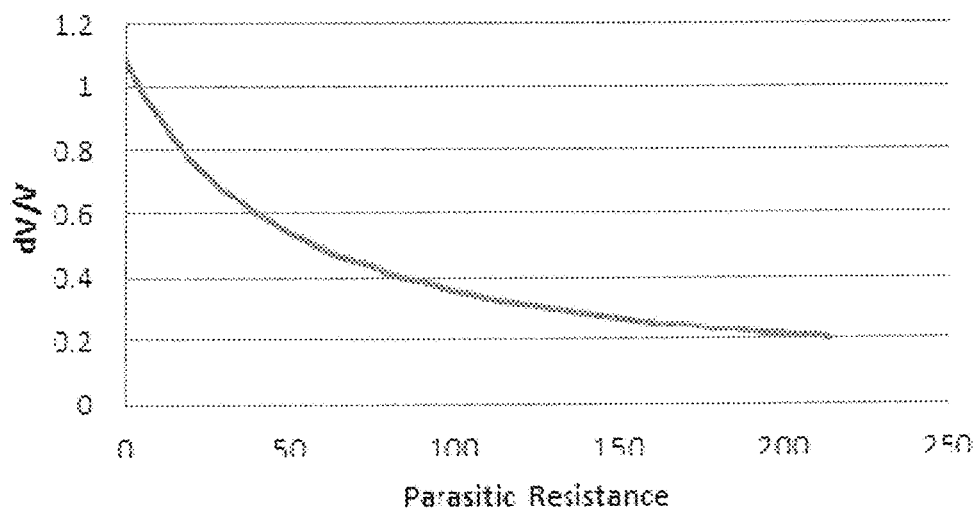
FIG. 3 is a graph showing attenuation of the signal-to-noise ratio (SNR) of a contact sensor due to parasitic resistance.

FIG. 3 is a graph showing attenuation of the SNR of a contact sensor due to parasitic resistance. FIG. 3 shows a precipitous drop in SNR (given in terms of dV/V) as a function of increasing parasitic resistance (given in Ohms). There are two negative impacts parasitic resistance has on contact sensor circuit SNR. First, for a fixed sensor circuit voltage bias, the more parasitic resistance in the sensor circuit the lower the amount of power dissipated in the contact sensor. This results in a cooler sensor that is less sensitive to heat transfer. This can be seen from Equation [1] below:

$$I^2 R_1 = \left[\frac{V_{bias}}{(R_1 + R_P)}\right]^2 R_1 \quad [1]$$

where I is the circuit current, $R_1$ is the contact sensor resistance, $V_{bias}$ is the circuit bias voltage, and $R_P$ is the circuit parasitic resistance.

Second, for a fixed current bias supplied to the sensor circuit, the relative voltage fluctuation of the circuit (~SNR) due the resistance fluctuation of the sensor element will be lower with a larger parasitic resistance. This can be seen from Equation [2] below:

$$\frac{\Delta V}{V} = \frac{R_0 \alpha (\Delta T)}{R_0 + R_P} \quad [2]$$

where $\Delta V$ is the voltage fluctuation of the circuit due to the resistance change of the sensor element, V is the voltage drop across the sensor element due to the fixed current bias, $R_0$ is the cold contact sensor resistance (wherein "cold" refers to the contact sensor in an unbiased state), $\alpha$ is the temperature coefficient of resistance (TCR) of the contact sensor element, and $\Delta T$ is the temperature change of the sensor element. Equations [1] and [2] above illustrate that contact sensor performance can be improved by reducing the parasitic resistance ($R_P$) of the contact sensor arrangement.

Figure 4:
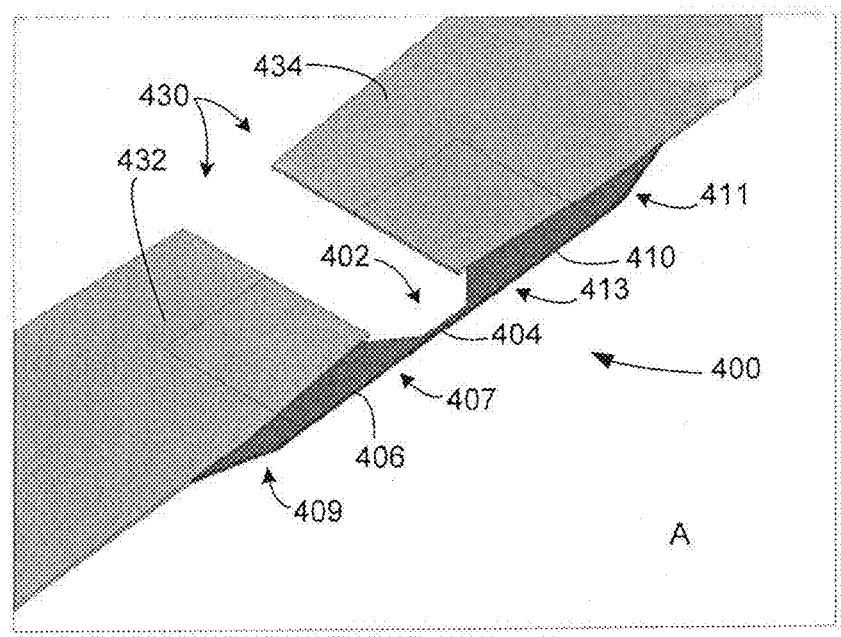
FIG. 4 illustrates a contact sensor circuit in accordance with various embodiments.

Turning now to FIG. 4, there is illustrated a contact sensor circuit 400 implemented in accordance with various embodiments. The contact sensor circuit 400 shown in FIG. 4 is referred to herein as a baseline configuration having the designation of circuit A. The contact sensor circuit 400 is devoid of a conductive overlay. In contrast to the baseline configuration of circuit A, the contact sensor circuits shown in FIGS. 5-9B are similar to the circuit A of FIG. 4 but include different configurations of an electrically conductive overlay, resulting in circuits having different performance characteristics (e.g., different parasitic resistance and SNR). A summary of the more important performance characteristics (parasitic resistance and peak SNR) for the circuit configurations shown in FIGS. 5-8 is plotted in FIG. 9C.

Referring again to FIG. 4, the contact sensor circuit 400 includes a contact sensor 402 connected to a lead arrangement 430. In the embodiment shown in FIG. 4, the contact sensor 402 has a "gull wing" design. The contact sensor 402 is formed from a material having a relatively high temperature coefficient of resistance (e.g., NiFe, W, Pt, Ir) and includes a sensor element 404 disposed between a pair of peripheral wings 406 and 410. The first and second peripheral wings 406 and 410 have a cross-sectional area larger than that of the sensor element 404 and a length several times (e.g., >4x) that of the sensor element 404. The first wing 406 includes an inner wing 407 connected to a first end of the sensor element 404 and an outer wing 409. The second wing 410 has an inner wing 413 connected to a second end of the sensor element 404 and an outer wing 411.

The lead arrangement 430 can be formed from a high thermal conductivity and low resistivity material, such as Cu or Au. The lead arrangement 430 includes a first lead 432 connected to the first wing 406 of the contact sensor 402. A second lead 434 of the lead arrangement 430 is connected to the second wing 410 of the contact sensor 402. The electrically conductive first and second leads 432 and 434 have cross-sectional area larger than that of the first and second peripheral wings 406 and 410. The first and second leads 432 and 434 are coupled to a pair of electrical bond pads of the slider directly or through conductive traces. When a bias current is applied to the contact sensor circuit 400 via the first and second leads 432 and 434, the temperature of the sensor element 404 increases relative to the temperature of the first and second wings 406 and 410. When biased for operation, the sensor element 404 is considered "hot" while portions of the first and second wings 406 and 410 are considered "cold." For example, and with reference to FIG. 10, the sensor element 404 can have a temperature in excess of 160° C., while the outer wings 409 and 411 can have a temperature of about 40° C. Regions of the contact sensor 402 between the sensor element 404 and the outer wings 409 and 411 can be considered "warm" for purposes of this discussion (e.g., varying temperatures between hot and cold).

As was previously discussed, the baseline configuration of the contact sensor circuit 400 (circuit A) shown in FIG. 4 is devoid of a conductive overlay. In modeling the baseline contact sensor circuit 400, the sensor circuit resistance, $R_1$, was 67Ω, the parasitic resistance, $R_P$, of the contact sensor circuit was 30Ω, and the cold contact sensor resistance, $R_0$, was 37Ω. The percentage of parasitic resistance in the contact sensor circuit 400 was 45% (e.g., $R_P/R_1$). The peak SNR for the baseline contact sensor circuit 400 was 3.20× $10^{-2}$ (normalized dV).

Figure 5:
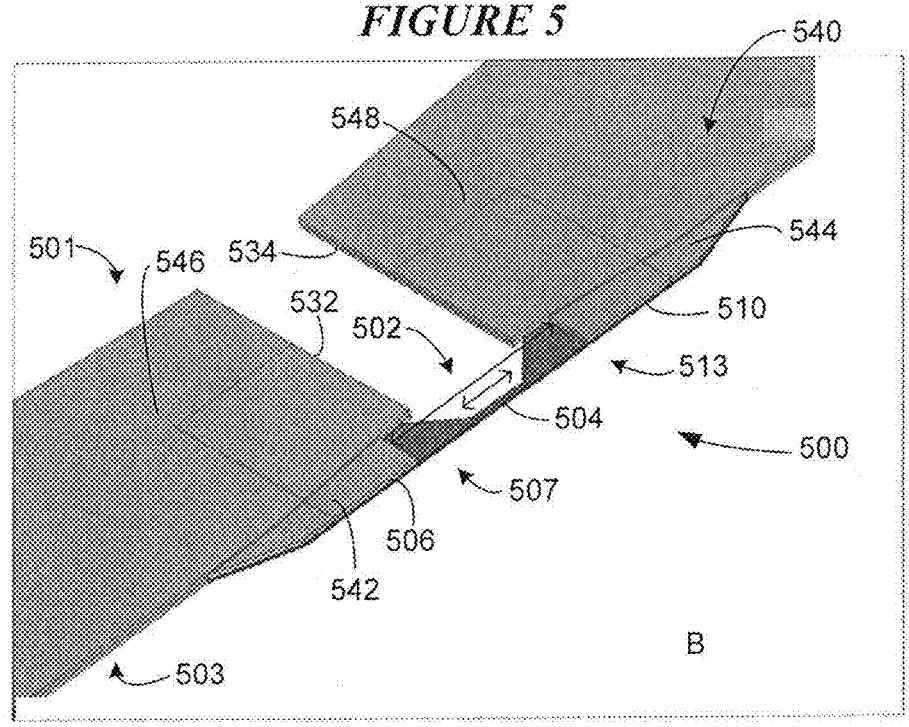
FIG. 5 illustrates a contact sensor circuit which includes an electrically conductive overlay in accordance with various embodiments.

FIG. 5 illustrates a contact sensor circuit 500 (circuit B) which includes an electrically conductive overlay 540 in accordance with various embodiments. It is noted that the contact sensor circuit 500 shown in FIG. 5 demonstrated the best performance (e.g., highest SNR) of the circuits shown in FIGS. 4-8. The sensor circuit 500 shown in FIG. 5 includes a first major surface 501 (surface extending out of the page) and a second major surface 503 (surface extending into the page). Portions of the first major surface 501 are shown to include the electrically conductive overlay 540. More particularly, the electrically conductive overlay 540 includes a region 542 covering a portion of the first peripheral wing 506, and a region 544 covering a portion of the second peripheral wing 510. The electrically conductive overlay 540 also includes a region 546 covering all or a substantial portion of the first lead 532, and a region 548 covering all or a substantial portion of the second lead 534.

Notably, the sensor element 504 and a portion of the inner wings 507 and 513 adjacent the sensor element 504 is devoid of the overlay 540. The extent of the conductive overlay 540 on the contact sensor 502 in the vicinity of the sensor element 504 is selected to achieve a reduced parasitic resistance while at the same time avoiding excessive heat sinking of the sensor element 504 which would result in reduced sensor performance. This balance of performance objectives can be achieved using the design guidelines discussed hereinbelow.

The electrically conductive overlay 540 in FIG. 5 and other figures can be formed from Au. As was discussed above, the first and second leads 532 and 534 in FIG. 5 and other figures can be formed from Cu or Au, and the contact sensor 502 can be formed from NiFe, W, Pt, or Ir. In the embodiment shown in FIG. 5, the sensor element 504 has a length of 0.75 μm and a height of 100 nm. The portion of the contact sensor 502 devoid of the overlay 540 has a length of 2.52 μm. The contact sensor 504 has a thickness (dimension into the page) of 45 nm, and the first and second leads 532 and 534 have a thickness of less than about 70 nm. In general, the conductive overlay 540 (and the overlays of other embodiments) has a thickness that can range between about 0.06 and 0.2 μm. In some embodiments, the conductive overlay 540 has a thickness of 65 nm. The overall length of the contact sensor 504 (wing tip-to-wing tip) is about 8 µm plus the active sensor length not at the ABS surface. The length of the contact sensor 504 at the ABS is about 5.25 µm plus the active sensor length. The wing depth from the ABS is about 1.1 µm. These dimensions will vary from one sensor design to another, and are provided for non-limiting illustrative purposes only. For example, the elements of embodiments of other figures can have the same or similar dimensions.

In modeling the contact sensor circuit 500 (circuit B), the sensor circuit resistance, $R_1$, was 59Ω, the parasitic resistance, $R_P$, of the contact sensor circuit 500 was 22Ω, and the cold contact sensor resistance, $R_0$, was 37Ω. The percentage of parasitic resistance in the contact sensor circuit 500 was 38%. The peak SNR for the contact sensor circuit 500 was $4.83 \times 10^{-2}$ (normalized dV). As was discussed previously, the contact sensor circuit 500 shown in FIG. 5 produced the highest peak SNR of all of the designs shown in FIGS. 4-8.

Figure 6:
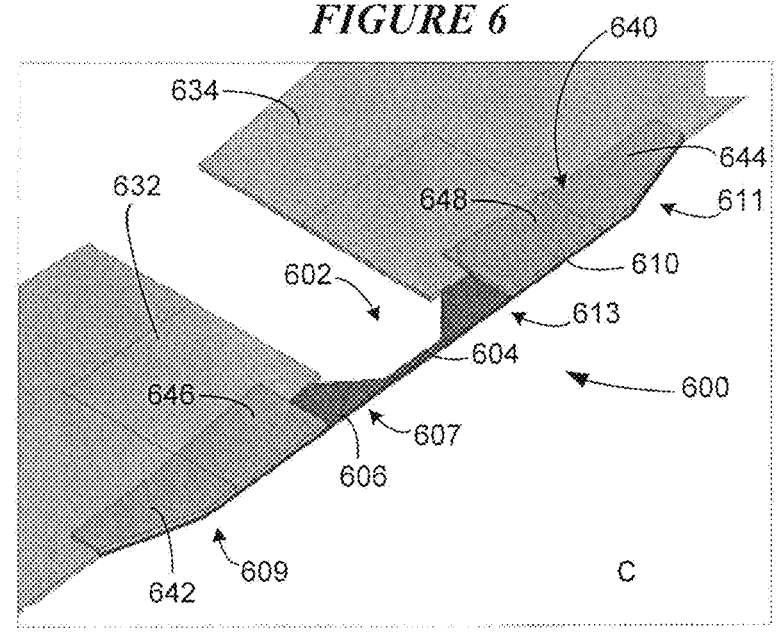
FIG. 6 illustrates a contact sensor circuit which includes an electrically conductive overlay in accordance with various embodiments.

FIG. 6 illustrates a contact sensor 600 (circuit C) which includes an electrically conductive overlay 640 having a configuration differing from that shown in FIG. 5. The contacts sensor 600 performed better than the baseline sensor circuit 400 (circuit A) shown in FIG. 4, but not as good as the contact circuit 500 shown in FIG. 5. The conductive overlay 640 includes a region 642 that covers an outer portion 609 of a first peripheral wing 606 and a region 646 that covers a portion of the first lead 632 adjacent the first wing 606. The conductive overlay 640 also includes a region 644 that covers an outer portion 611 of a second peripheral wing 610 and a region 648 that covers a portion of the second lead 634 adjacent the second wing 610. The sensor element 604 and inner portions 607 and 613 of the first and second wings 606 and 610 adjacent the sensor element 604 are devoid of the overlay 640. The extent of the conductive overlay 640 on the contact sensor 602 in the vicinity of the sensor element 604 is selected to achieve a reduced parasitic resistance while at the same time avoiding excessive heat sinking of the sensor element 604 which would result in reduced sensor performance.

The surface area of the overlay 640 covering the contact sensor 602 shown in FIG. 6 is similar to that covering the contact sensor 502 in FIG. 5. However, in FIG. 6, the conductive overlay 640 covers only a small surface area of the first and second leads 632 and 634 as compared to the coverage over the first and second leads 532 and 534 of contact sensor circuit 500 shown in FIG. 5. The reduction in conductive overlay 640 covering the first and second leads 632 and 634 for contact sensor 600 resulted in increased parasitic resistance in the contact sensor circuit 600 and a reduced peak SNR relative to the contact sensor circuit 500 shown in FIG. 5.

In modeling the contact sensor circuit 600 (circuit C), the sensor circuit resistance, $R_1$, was 64Ω, the parasitic resistance, $R_P$, of the contact sensor circuit 600 was 27Ω, and the cold contact sensor resistance, $R_0$, was 37Ω. The percentage of parasitic resistance in the contact sensor circuit 600 was 42%. The peak SNR for the contact sensor circuit 600 was $3.51 \times 10^{-2}$ (normalized dV).

Figure 7:
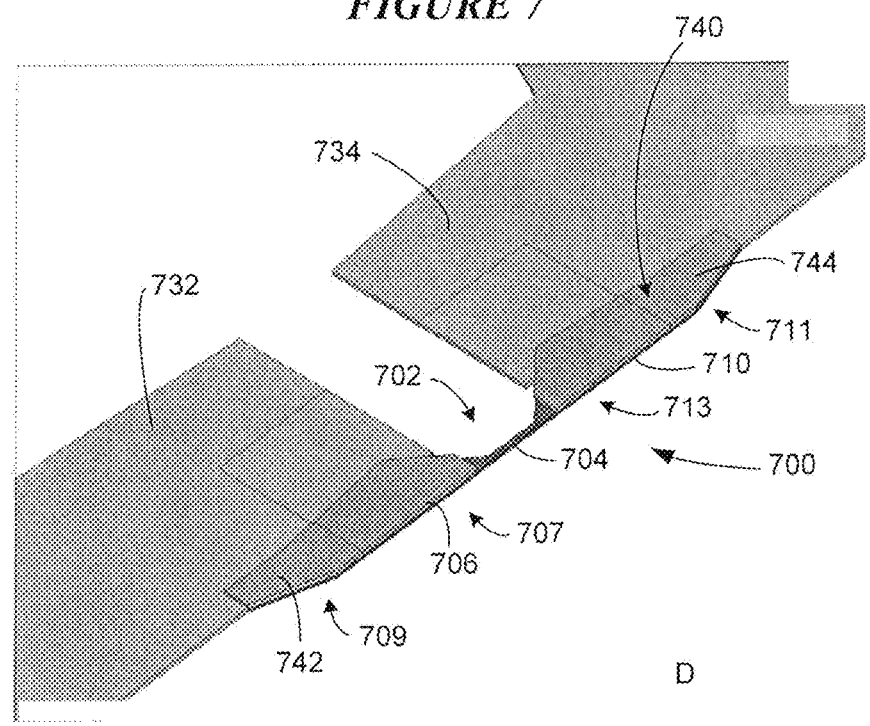
FIG. 7 illustrates a contact sensor circuit which includes an electrically conductive overlay in accordance with various embodiments.

FIG. 7 illustrates a contact sensor circuit 700 (circuit D) which includes an electrically conductive overlay 740 having a configuration differing from that shown in FIGS. 5 and 6. The contact sensor circuit 700 performed poorer than the baseline sensor circuit 400 (circuit A) shown in FIG. 4. The conductive overlay 740 includes a region 742 that covers a significant portion of a first peripheral wing 706. More particularly, the overlay region 742 covers the entire outer wing 709 and nearly all of the inner wing 707 of the first wing 706. The sensor element 704 and an inner portion of the first and second wings 706 and 710 adjacent the sensor element 704 are devoid of the overlay 740. The extent of the conductive overlay 740 on the contact sensor 702 in the vicinity of the sensor element 704 is selected to achieve a reduced parasitic resistance while at the same time avoiding excessive heat sinking of the sensor element 704 which would result in reduced sensor performance. The conductive overlay 740 includes a region 744 that covers a significant portion of a second peripheral wing 710. In particular, the overlay region 744 covers the entire outer wing 711 and nearly all of the inner wing 713 of the second wing 710. The conductive overlay 740 covers only a small surface area of the first and second leads 732 and 734 as compared to the lead coverage of the contact sensor circuit 500 shown in FIG. 5.

In modeling the contact sensor circuit 700 (circuit D), the sensor circuit resistance, $R_1$, was 56Ω, the parasitic resistance, $R_P$, of the contact sensor circuit 700 was 20Ω, and the cold contact sensor resistance, $R_0$, was 37Ω. The percentage of parasitic resistance in the contact sensor circuit 700 was 35%. The peak SNR for the contact sensor circuit 700 was $2.90 \times 10^{-2}$ (normalized dV).

Although the parasitic resistance for the contact sensor circuit 700 is significantly less than that for the baseline contact sensor circuit 400 shown in FIG. 4, the peak SNR for the contact sensor circuit 700 is less than that of the baseline contact sensor circuit 400. The reduced peak SNR for the contact sensor circuit 700 is primarily due to increased heat sinking from the hot sensor element 704 to the conductive overlay regions 742 and 744 (at the inner wings 707 and 713) that encroach the hot sensor element 704. It can be appreciated that a contact sensor design that causes excessive heat sinking of the sensor element to the conductive overlay during operation results in reduced contact sensor performance.

FIG. 8 illustrates a contact sensor circuit 800 (circuit E) which includes an electrically conductive overlay 840 having a configuration differing from that shown in FIGS. 5-7. The contact sensor circuit 800 had the poorest performance of any of the designs shown in FIGS. 4-7. The conductive overlay 840 includes a region 842 that covers all of a first peripheral wing 806 (all of the outer wing 809 and the inner wing 807). The conductive overlay 840 also includes a region 844 that covers all of a second peripheral wing 810 (all of the outer wing 811 and the inner wing 813). The sensor element 804 of the contact sensor 802 is devoid of the conductive overlay 840. The conductive overlay 840 covers all or a substantial portion of the first lead 832 (region 846), and also covers all or a substantial portion of the second lead 834 (region 848).

In modeling the contact sensor circuit 800 (circuit E), the sensor circuit resistance, $R_1$, was 40Ω, the parasitic resistance, $R_P$, of the contact sensor circuit 800 was 3Ω, and the cold contact sensor resistance, $R_0$, was 40Ω. The percentage of parasitic resistance in the contact sensor circuit 800 was 8%. The peak SNR for the contact sensor circuit 800 was $1.78 \times 10^{-2}$ (normalized dV).

Although the parasitic resistance for the contact sensor circuit 800 of 3Ω is substantially lower than that of the other sensor designs, the peak SNR for the contact sensor circuit 800 is a fraction of that of the other designs. The reduced peak SNR for the contact sensor circuit 800 is primarily due to increased heat sinking from the hot sensor element 804 to the conductive overlay regions 842 and 844 (cover the entire inner wings 807 and 813) that abut the hot sensor element 804. The poor performance of the contact sensor circuit 800 demonstrates that reducing parasitic resistance alone does not produce improved contact sensor performance. Rather, good contact sensor performance can be realized by optimizing coverage of the conductive overlay to achieve reduced parasitic resistance and heat sinking of the sensor element to the overlay.

Figure 9A:
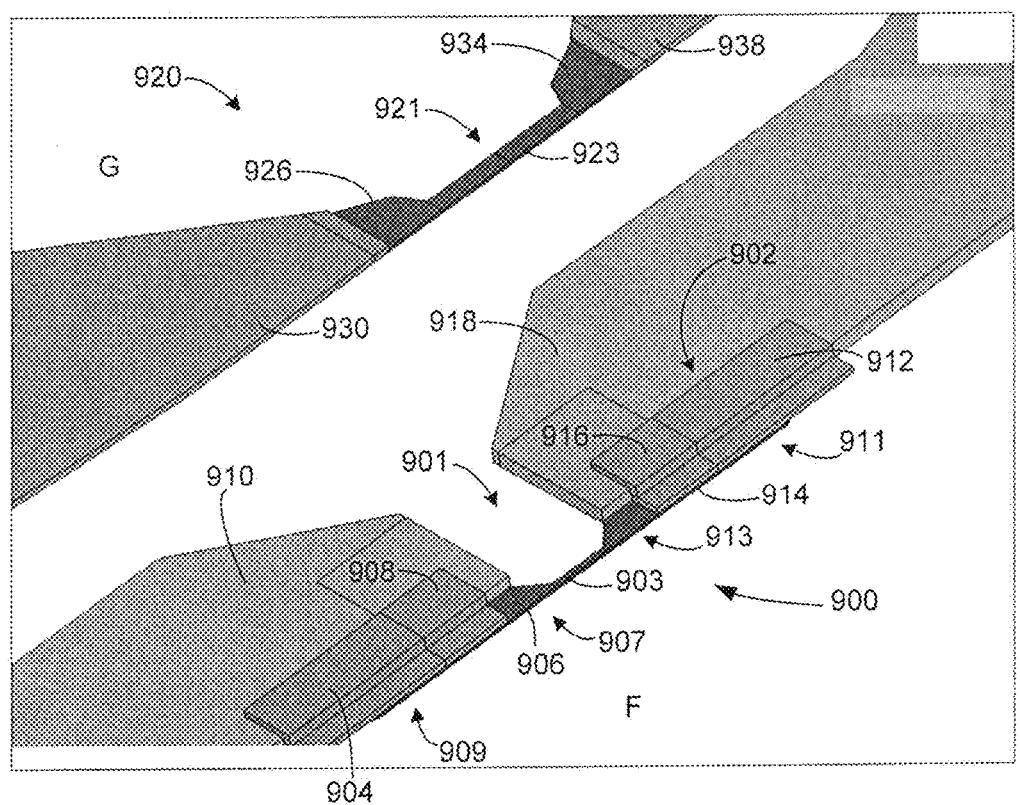
FIG. 9A illustrates reader and writer contact sensor circuits which include an electrically conductive overlay in accordance with various embodiments.

FIG. 9A illustrates a first contact sensor circuit 900 (circuit F) and a second contact sensor circuit 920 (circuit G), each of which includes an electrically conductive overlay having a configuration differing from that shown in FIG. 5-8. According to some embodiments, the first contact sensor circuit 900 is situated proximate the reader of a slider, and the second contact sensor circuit 920 is situated proximate the writer of the slider. The first and second contact sensor circuits 900 and 920 are electrically coupled to one another, typically in series (optionally in parallel).

Referring to the first contact sensor circuit 900 shown in FIG. 9A, a conductive overlay 902 includes a region 904 that covers an outer portion 909 of a first peripheral wing 906 and a region 908 that covers a portion of the first lead 910 adjacent the first wing 906. The conductive overlay 902 also includes a region 912 that covers an outer portion 911 of a second peripheral wing 914 and a region 916 that covers a portion of the second lead 918 adjacent the second wing 914. The surface area of the overlay 902 covering the contact sensor 901 shown in FIG. 9A is similar to that covering the contact sensor 502 in FIG. 5. However, in FIG. 9A, the conductive overlay 902 covers only a small surface area of the first and second leads 910 and 918 as compared to the coverage over the first and second leads 532 and 534 of contact sensor circuit 500 shown in FIG. 5.

The sensor element 903 and inner portions 907 and 913 of the first and second wings 906 and 914 adjacent the sensor element 903 are devoid of the overlay 902. The extent of the conductive overlay 902 on the contact sensor 901 in the vicinity of the sensor element 903 is selected to achieve a reduced parasitic resistance while at the same time avoiding excessive heat sinking of the sensor element 903 which would result in reduced sensor performance.

As was discussed above, the first contact sensor circuit 900 can be electrically coupled to the second contact sensor circuit 920 when implemented on a slider for purposes of performing contact detection at the reader and writer, respectively. The second contact sensor circuit 920 includes a contact sensor 921 comprising an elongated sensor element 923 adjacent a first peripheral wing 926 and a second peripheral wing 934. The first peripheral wing 926 is connected to a first lead 930 and the second peripheral wing 934 is connected to a second lead 938. The first and second leads 930 and 938 can be formed from Au or Cu. The contact sensor 921 can be formed from NiFe, W, Pt, or Ir. It can be seen in FIG. 9A that the sensor element 923 of the second contact sensor circuit 920 is longer and taller than the sensor element 903 of the first contact sensor circuit 900.

In modeling the first contact sensor circuit 900 (circuit F), the sensor circuit resistance, $R_1$, was 186.5Ω, the parasitic resistance, $R_P$, of the contact sensor circuit 900 was 143.3Ω, and the cold contact sensor resistance, $R_0$, was 43.2Ω. The percentage of parasitic resistance in the contact sensor circuit 900 was 77%. The peak SNR for the contact sensor circuit 900 was $1.7 \times 10^{-2}$ (normalized dV).

Figure 9B:
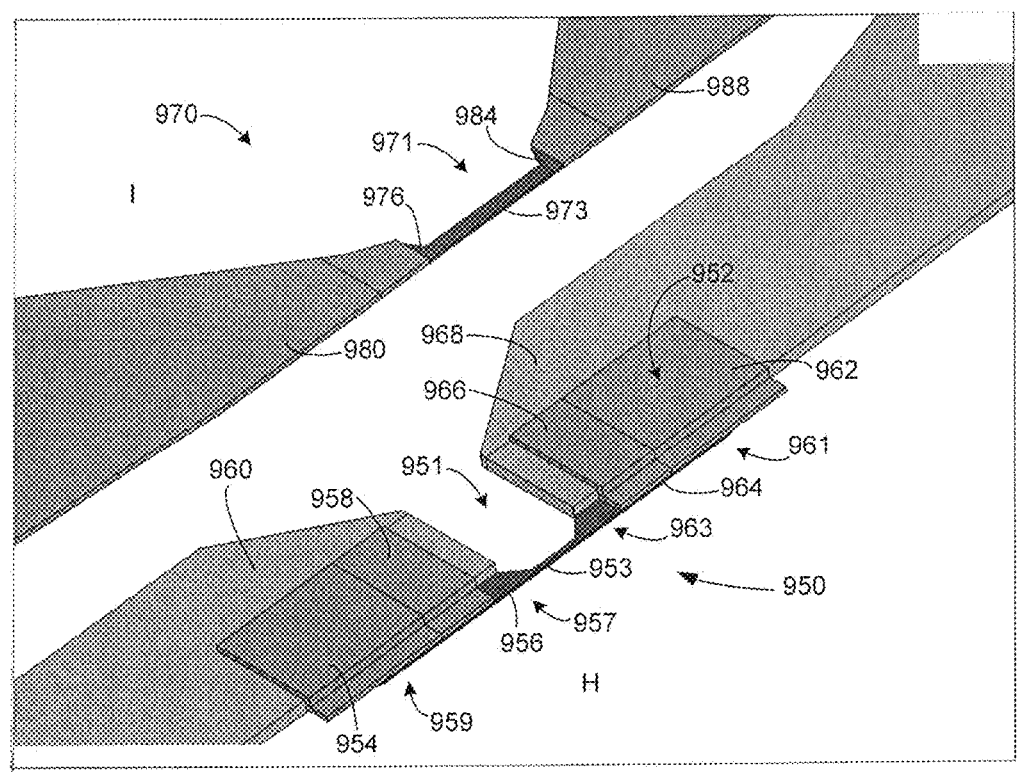
FIG. 9B illustrates reader and writer contact sensor circuits which include an electrically conductive overlay in accordance with various embodiments.

FIG. 9B illustrates a first contact sensor circuit 950 (circuit H) and a second contact sensor circuit 970 (circuit I), each of which includes an electrically conductive overlay having a configuration differing from that shown in FIG. 5-9A. According to some embodiments, the first contact sensor circuit 950 is situated proximate the reader of a slider, and the second contact sensor circuit 970 is situated proximate the writer of the slider. The first and second contact sensor circuits 950 and 970 are electrically coupled to one another, typically in series (optionally in parallel).

Referring to the first contact sensor circuit 950 shown in FIG. 9B, a conductive overlay 952 includes a region 954 that covers an outer portion 959 of a first peripheral wing 956 and a region 958 that covers a portion of the first lead 960 adjacent the first wing 956. The conductive overlay 952 also includes a region 962 that covers an outer portion 961 of a second peripheral wing 964 and a region 966 that covers a portion of the second lead 968 adjacent the second wing 964. The surface area of the overlay 952 covering the contact sensor 951 shown in FIG. 9B is similar to that covering the contact sensor 901 in FIG. 9A. However, in FIG. 9B, the conductive overlay 952 covers a larger surface area of the first and second leads 960 and 968 as compared to the coverage over the first and second leads 910 and 918 of contact sensor circuit 900 shown in FIG. 9A. This larger surface area coverage by the conductive overlay 952 in the embodiment shown in FIG. 9B (versus that shown in FIG. 9A) more aggressively reduces the parasitic resistance of the first contact sensor circuit 950.

The sensor element 953 and inner portions 957 and 963 of the first and second wings 956 and 964 adjacent the sensor element 953 are devoid of the overlay 952. The extent of the conductive overlay 952 on the contact sensor 951 in the vicinity of the sensor element 953 is selected to achieve a reduced parasitic resistance while at the same time avoiding excessive heat sinking of the sensor element 953 which would result in reduced sensor performance.

As was discussed above, the first contact sensor circuit 950 can be electrically coupled to the second contact sensor circuit 970 when implemented on a slider for purposes of performing contact detection at the reader and writer, respectively. The second contact sensor circuit 970 includes a contact sensor 971 comprising an elongated sensor element 973 adjacent a first peripheral wing 976 and a second peripheral wing 984. The first peripheral wing 976 is connected to a first lead 980 and the second peripheral wing 984 is connected to a second lead 988. The first and second leads 980 and 988 can be formed from Au or Cu. The contact sensor 971 can be formed from NiFe, W, Pt, or Ir. It can be seen in FIG. 9B that the sensor element 973 of the second contact sensor circuit 970 is longer and taller than the sensor element 953 of the first contact sensor circuit 950. As compared to the contact sensor 921 shown in FIG. 9A, the contact sensor 971 shown in FIG. 9B has more of its surface area covered by a conductive overlay (e.g., material (Cu or Au) of the first and second leads 980 and 988), thereby more aggressively reducing parasitic resistance of the second contact sensor circuit 970.

In modeling the first contact sensor circuit 950 (circuit H), the sensor circuit resistance, $R_1$, was 176.9Ω, the parasitic resistance, $R_P$, of the contact sensor circuit 900 was 133.7Ω, and the cold contact sensor resistance, $R_0$, was 43.2Ω. The percentage of parasitic resistance in the contact sensor circuit 900 was 75%. The peak SNR for the contact sensor circuit 900 was $1.6 \times 10^{-2}$ (normalized dV).

Figure 9C:
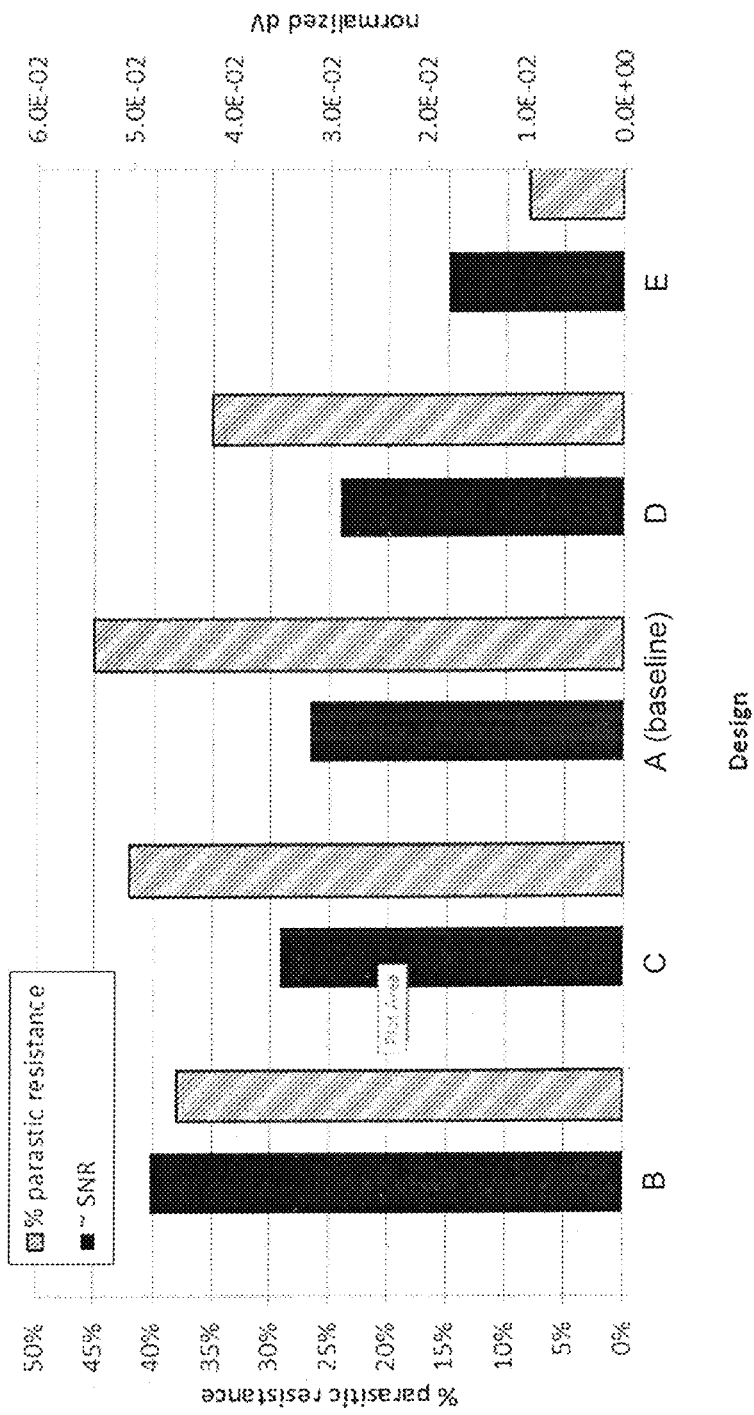
FIG. 9C is a plot showing the parasitic resistance and peak SNR for each of the contact sensors shown in FIGS. 4-8.

FIG. 9C is a plot showing the parasitic resistance and peak SNR for each of the contact sensor designs shown in FIGS. 4-8. It can be seen in FIG. 9C that all of the designs that included a conductive overlay resulted in a reduction in the percentage of parasitic resistance of the contact sensor circuit when compared to the baseline contact sensor A (circuit 400 shown in FIG. 4). It can also be seen in FIG. 9C that the designs with the lowest percentages of parasitic resistance (contact sensors D and E) exhibited the poorest peak SNRs.

Figure 10:
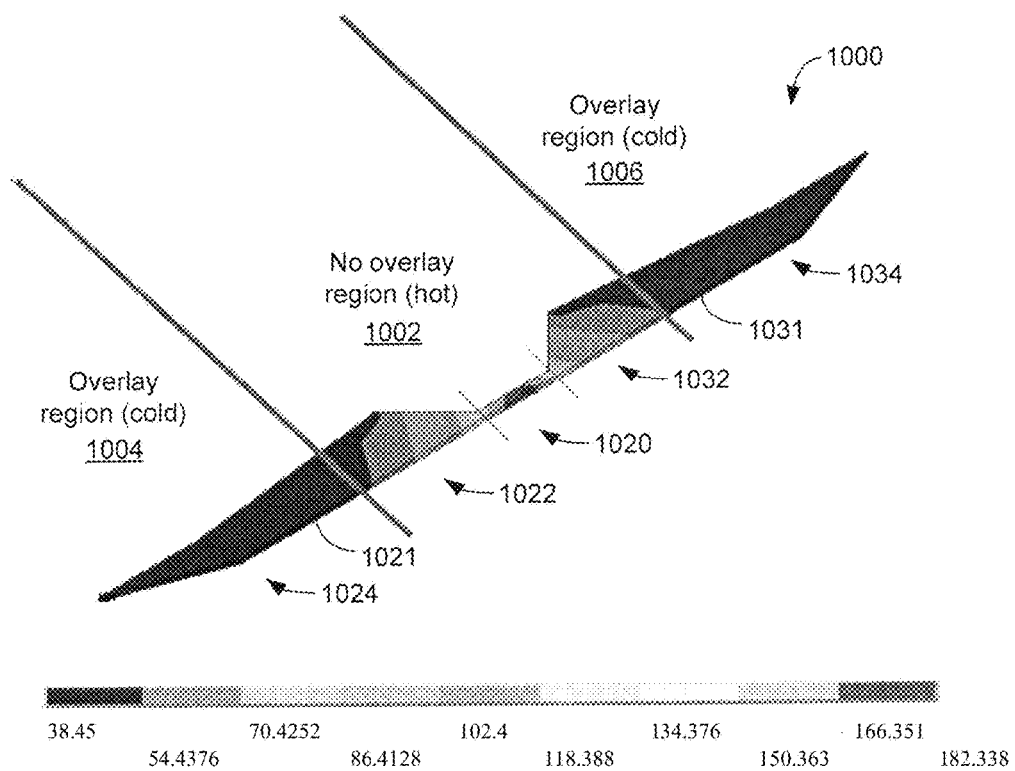
FIG. 10 shows the temperature contours of a contact sensor in a biased state according to various embodiments.

FIG. 10 shows the temperature contours of a contact sensor 1000 in a biased state according to various embodiments. The contact sensor 1000 shown in FIG. 10 facilitates a discussion of design guidelines for applying an electrically conductive overlay on the contact sensor 1000 to achieve both a reduction in the parasitic resistance of the sensor 1000 and a reduction in heat sinking of the sensor element 1020 to the overlay. In the biased state, the sensor element 1020 is considered hot (elevated temperature relative to the surrounding portions of the slider), while the first and second wings 1021 and 1031 are considered cold (e.g., the same temperature as the surrounding portions of the slider). In the illustrative example shown in FIG. 10, the contact sensor 1000 is biased at a voltage of 100 mV and at a constant current of about 1.4 mA. At this biasing, most of the sensor element 1020 has a temperature in excess of 150° C., the outer wings 1024 and 1034 have a temperature of about 38° C., and the inner wings 1022 and 1032 have a variation in temperature between the temperature of the contact sensor 1020 and that of the inner wings 1022 and 1032 and the outer wings 1024 and 1034.

As a general design guideline, the conductive overlay can be applied to the cold regions 1004 and 1006 of the contact sensor 1000, while the hot region 1002 of the contact sensor 1000 should be devoid of the overlay. In the temperature transition zone between the outer wings 1024, 1034 and the sensor element 1020 (e.g., the inner wings 1022 and 1032), care should be taken to avoid applying the conductive overlay in this region. Minimizing overlay coverage in the temperature transition zone reduces the risk of heat sinking from the sensor element 1020 to the conductive overlay (although some encroachment into the temperature transition zone can be tolerated in some designs). It is noted that the size of the hot and cold regions 1002, 1004, and 1006 will vary depending on the biasing of the contact sensor 1000. For example, if the contact sensor 1000 were biased at 1.0 mA rather than 1.4 mA, the size of the cold regions 1004 and 1006 shown in FIG. 10 would increase, and the size of the hot region 1002 would decrease.

As a more specific design guideline, the conductive overlay can be applied to portions of the peripheral wings 1021 and 1031 that have a temperature profile that is the same whether the sensor 1000 is biased or unbiased. For example, the cold regions 1004 and 1006 of the contact sensor 1000 remain at about 38° C. when the contact sensor 1000 is in a biased state and when the sensor 1000 is in an unbiased state. In other words, the portion of the peripheral wings 1021 and 1031 that can be covered by the conductive overlay has a first temperature profile when the sensor is biased and a second temperature profile when the sensor is unbiased, such that the first and second temperature profiles are substantially the same.

As another more specific design guideline, the portion of the peripheral wings 1021 and 1031 that can be covered by the conductive overlay has a temperature gradient of about zero when the sensor is biased and when the sensor is unbiased. In other words, the portion of the peripheral wings 1021 and 1031 that can be covered by the conductive overlay has a first temperature gradient when the sensor is biased and a second temperature gradient when the sensor is unbiased, such that the first and second temperature gradients are about zero. It is noted that these design guidelines can be applied to contact sensors and circuits having a variety of configurations, and are not limited to gull wing contact sensor designs.

Figure 11:
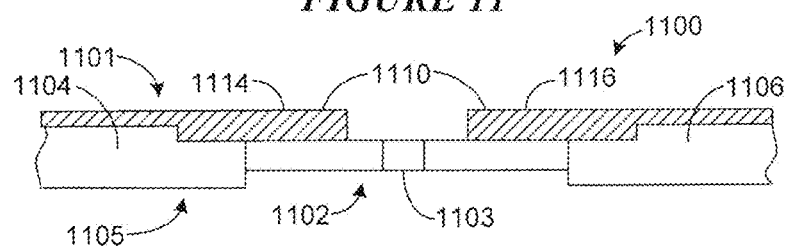
FIG. 11 shows a cross-sectional view of a portion of a contact sensor circuit which incorporates a conductive overlay in accordance with various embodiments.

FIG. 11 shows a cross-sectional view of a portion of a contact sensor circuit 1100 which incorporates a conductive overlay 1110 in accordance with various embodiments. The contact sensor circuit 1100 includes a first major surface 1101 and an opposing second major surface 1105. The first and second major surfaces 1101 and 1105 extend from an air bearing surface of the slider into the body of the slider. The contact sensor circuit 1100 includes a contact sensor 1102 comprising a sensor element 1103. The contact sensor 1102 has a first end connected to a first electrical lead 1104 and a second end connected to a second electrical lead 1106. In the embodiment shown in FIG. 11, the conductive overlay 1110 is applied to the first major surface 1101. The second major surface 1105 is devoid of a conductive overlay. The conductive overlay 1110 includes a first region 1114 that covers a peripheral portion of the contact sensor 1102 and some or all of the first lead 1104. The conductive overlay 1110 includes a second region 1116 that covers a peripheral portion of the contact sensor 1102 and some or all of the second lead 1106.

Figure 12:
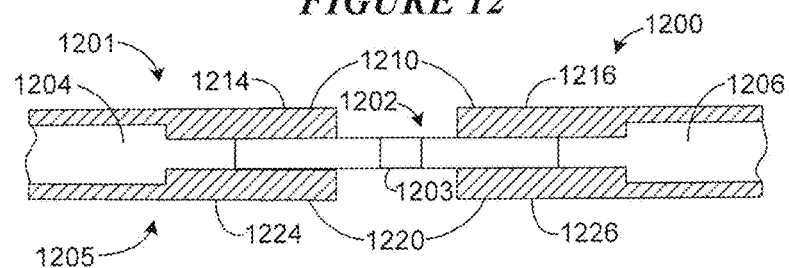
FIG. 12 shows a cross-sectional view of a portion of a contact sensor circuit which incorporates multiple conductive overlays in accordance with various embodiments.

FIG. 12 shows a cross-sectional view of a portion of a contact sensor circuit 1200 which incorporates a multiplicity of conductive overlays 1210 and 1220 in accordance with various embodiments. The contact sensor circuit 1200 includes a first major surface 1201 and an opposing second major surface 1205. The first and second major surfaces 1201 and 1205 extend from an air bearing surface of the slider into the body of the slider. The contact sensor circuit 1200 includes a contact sensor 1202 comprising a sensor element 1203. The contact sensor 1202 has a first end connected to a first electrical lead 1204 and a second end connected to a second electrical lead 1206. In the embodiment shown in FIG. 12, a first conductive overlay 1210 is applied to the first major surface 1201. A second conductive overlay 1220 is applied to the second major surface 1205.

The first conductive overlay 1210 applied to the first major surface 1201 includes a first region 1214 that covers a peripheral portion of the contact sensor 1202 and some or all of the first lead 1204. The first conductive overlay 1210 includes a second region 1216 that covers a peripheral portion of the contact sensor 1202 and some or all of the second lead 1206. The second conductive overlay 1220 applied to the second major surface 1205 includes a first region 1224 that covers a peripheral portion of the contact sensor 1202 and some or all of the first lead 1204. The second conductive overlay 1220 includes a second region 1226 that covers a peripheral portion of the contact sensor 1202 and some or all of the second lead 1206. In the embodiments shown in FIGS. 11 and 12, the contact sensors 1102 and 1202 can have a gull wing design or other design.

In accordance with other embodiments, and with continued reference to FIGS. 11 and 12, the function of the overlays 1114, 1116, 1224, 1226 can be achieved without depositing a separate overlay material over the peripheral portion of the contact sensor 1102, 1202 and the leads 1104, 1106, 1204, 1206. Instead of using a separate overlay material, the cross-sectional area of the leads 1104, 1106, 1204, 1206 and the peripheral portion (e.g., outer wing or cold region) of the contact sensor 1102, 1202 can be increased by making these regions thicker during fabrication. For example, and with reference to FIG. 11, the overlay 1110 would be formed during lead fabrication as extensions of the leads 1104 and 1106 using the same material as the leads 1104 and 1106. With reference to FIG. 12, the overlays 1210 and 1220 would be formed during lead fabrication as extension of the leads 1204 and 1206 using the same material as the leads 1204 and 1206.

Figure 13:
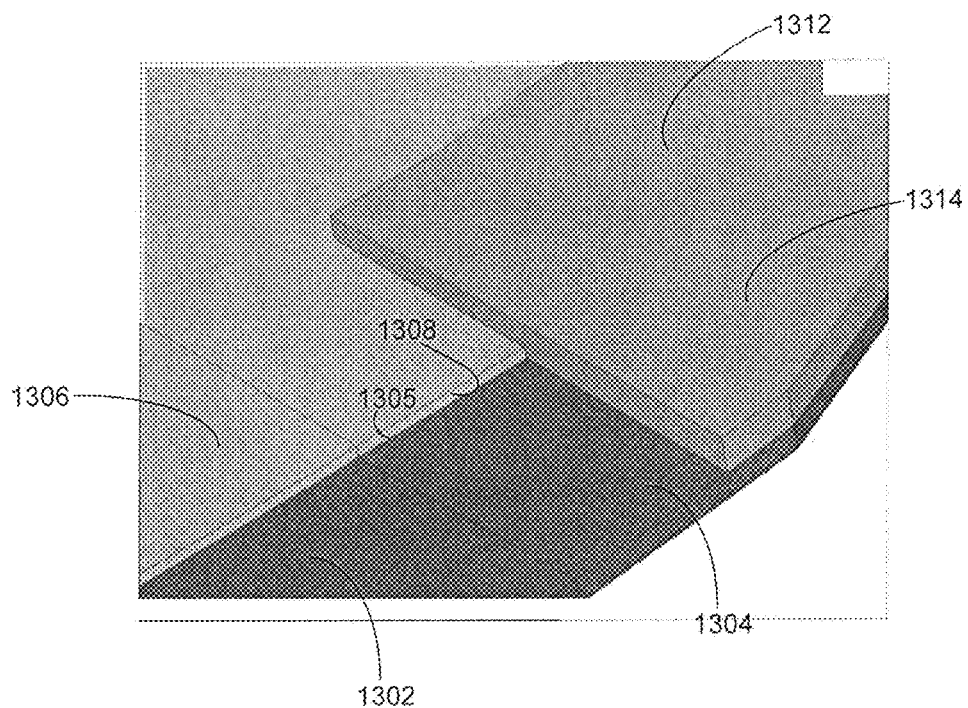
FIG. 13 is a detailed view of an abutted junction formed between a conductive overlay and an electrically conductive lead in accordance with various embodiments.

FIG. 13 is a detailed view of an abutted junction formed between a wing 1304 of a contact sensor 1302 and an electrically conductive lead 1306 in accordance with various embodiments. It is understood that a similar abutted junction is formed between the opposing sensor wing and opposing conductive lead (neither shown in FIG. 13). The wing 1304 of the contact sensor 1302 includes an edge 1305 that abuts with an edge 1308 of the lead 1306. Edges 1305 and 1308 form an abutted junction. A conductive overlay 1312 is formed over portions of the wing 1304 and the lead 1306 including the abutted junction 1305/1308. As was discussed previously, the contact sensor 1302 can have a thickness of about 45 nm and be formed from NiFe, W, Pt, or Ir, for example. Lead 1306 can be formed from Au, Cu, etc. (any non-magnetic, high thermal conductivity, low resistivity material) and have a thickness between about 0.06 to 0.2 μm, for example. The conductive overlay 1312 can also be formed from Au, Cu, etc. (any non-magnetic, high thermal conductivity, low resistivity material) and have a thickness between about 0.06 to 0.2 μm, for example.

The overlay 1312 shown in the embodiment of FIG. 13 can be formed in two ways, for example. According to a first fabrication approach, the contact sensor 1302 and wings (one wing 1304 shown in FIG. 13, the opposing wing is not shown) are patterned with one mask which is subsequently removed. A mask is then patterned that defines the shape of the lead 1306 and the portion 1314 of the overlay 1312 over the sensor wings (e.g., 1304). Metal is then deposited and then the mask is lifted off. According to a second fabrication approach, the contact sensor 1302 and sensor wings (e.g., 1304) are patterned to the final dimension using a mask followed by removal of the mask. A mask is then patterned that defines the shape of the lead 1306 and the overlay portion 1314 over the wings (e.g., 1304). Metal is then deposited followed by removal of the mask.

According to some embodiments, a multiplicity of contact sensors with conductive overlays can be incorporated in each recording head of a data storage device. In a data storage device configured to implement interlaced magnetic recording, for example, one such contact sensor is situated proximate each of two writers provided on each recording head of the IMR device. FIG. 14 illustrates a data storage device 1400 including a recording head 1420 for writing data on a magnetic storage medium 1408 in accordance with an IMR methodology. As illustrated in View A of FIG. 14, the storage medium 1408 rotates about a spindle center or a disk axis of rotation 1412 during rotation, and includes an inner diameter 1404 and an outer diameter 1402 between which are a number of concentric data tracks 1410. Information may be written to and read from data bit locations in the data tracks on the storage medium 1408. The recording head 1420 is mounted on an actuator assembly 1409 at an end distal to an actuator axis of rotation 1414. The recording head 1420 flies in close proximity above the surface of the storage medium 1408 during disk rotation. A seek operation positions the recording head 1420 over a target data track for read and write operations.

Referring to View B of FIG. 14, the recording head 1420 includes two different writers 1426 and 1428, also referred to as write elements. The writers 1426 and 1428 are shown to be in alignment in the cross-track direction; however, other write element configurations are contemplated for use in other implementations. Each of the writers 1426 and 1428 includes a write pole (not shown) that converts a series of electrical pulses sent from a controller 1406 into a series of magnetic pulses of commensurate magnitude and length, and the magnetic pulses selectively magnetize magnetic grains of the rotating magnetic media 1408 as they pass below the write element 1426 or 1428. As can be seen in View B, a first contact sensor 1433 is situated proximate the writer 1426, and a second contact sensor 1435 is situated proximate the writer 1428. Each of the contact sensors 1433 and 1435 includes an electrically conductive overlay of a type discussed hereinabove.

View C of FIG. 14 illustrates magnified views 1450 and 1452 of a same surface portion of the storage media 1408 according to different write methodologies and settings of the storage device 1400. Specifically, the magnified views 1450 and 1452 include a number of magnetically polarized regions, also referred to herein as "data bits," along the data tracks of the storage media 1408. Each of the data bits (e.g., a data bit 1427) represents one or more individual data bits of a same state (e.g., is or Os). For example, the data bit 1429 is a magnetically polarized region representing multiple bits of a first state (e.g., "000"), while the adjacent data bit 1427 is an oppositely polarized region representing one or more bits of a second state (e.g., a single "1"). The data bits in each of the magnified views 1450, 1452 are not necessarily illustrative of the actual shapes or separations of the bits within an individual system configuration.

The magnified view 1450 in View C of FIG. 14 illustrates magnetic transitions recorded according to a conventional magnetic recording (CMR) technique. In a CMR system, all written data tracks are randomly writeable and of substantially equal width. A random write refers to a write operation to a first data track that does not critically impair (e.g., corrupt or erase) data on either adjacent track. According to one implementation, the recorded data bits of the magnified view 1450 are recorded with a same write element (e.g., either the write element 1426 or 1428) of the recording head 1420.

In a CMR system, an achievable linear density (e.g., density along an individual data track) is limited by the size of the write element used to write the data encoded on the storage medium 1408. For example, the data bit 1427 may represent the smallest data bit recordable by a particular write element. Likewise, a read element (not shown) may have difficulty deciphering the data recorded on the media 1408 if the various polarized regions are too small or placed too close to one another.

The magnified view 1452 illustrates data bits recorded according to another set of system parameters implementing an IMR technique. According to one implementation, this IMR technique provides for a higher total areal density capability with a lower observable BER than conventional recording systems.

Specifically, the magnified view 1452 illustrates alternating data tracks of different track widths and different linear densities. The write element 1428 is used to write a first grouping of alternating data tracks (e.g., data tracks 1458, 1460, and 1462) with a wide written track width, while the write element 1426 is used to write a second grouping of interlaced data tracks (e.g., the data tracks 1464, 1466) with a narrower written track width. Data of the narrow, interlaced data tracks overwrites edges of adjacent and previously written data tracks of the wider width.

For example, writing of the data track 1464 overwrites data on the adjacent edges of the data tracks 1464 and 1466. In other words, a defined track pitch (e.g., radial spacing between centers of two directly adjacent data tracks) is by design less than the write width of the wide write element 1428 but greater than or approximately equal to the write width of the narrow write element 1426.

In another implementation, the first grouping of data tracks (e.g., the data tracks 1458, 1460, and 1462) includes data of a higher linear density than the interlaced tracks (e.g., the data tracks 1464 and 1466). Other implementations of the disclosed technology may provide for data tracks of three or more different written track widths and/or three or more different linear densities on a same surface of the magnetic storage medium 1408.

To generate the IMR pattern shown in magnified view 1452, a storage controller 1406 of the storage device 1400 alters one or more system parameters (e.g., write current, overshoot, waveform, etc.) based on a discrete write location where data is received and stored on the storage medium 1408. For example, the storage controller 1406 may write even-numbered data tracks on the storage medium 1408 with a first linear density and track width and write odd-numbered data tracks on the magnetic media with a second linear density and different track width.

In one implementation, the storage medium 1408 is divided radially into zones and each zone is associated with multiple linear densities. For example, two different linear densities may be used to write data of alternating tracks within each individual radial zone. The linear densities used in one radial zone may differ from the linear densities used in any other radial zone of the storage medium 1408.

Further, the controller 1406 may be configured to systematically direct incoming write commands to different data tracks of the storage medium according to a number of prioritized random access (PRA) rules. For example, the controller 1406 selects storage locations for each incoming write command to systematically maximize a total number of possible random writes.

In general, PRA rules dictate an order in which two or more data tracks on the magnetic storage medium 1408 are to be written. For example, a PRA rule may specify that a particular data track (center data track) is to be written before either of the data tracks adjacent to the particular data track. In this case, the particular data track is randomly writable if the adjacent data tracks do not contain any data. If however, data is already stored on either of the adjacent data tracks, the data write to the particular data track may include: (1) caching the data on one or both of the adjacent data tracks; (2) writing the particular track; and (3) subsequently, re-writing the data of one or both of the adjacent data tracks. Embodiments that use IMR when writing data can be implemented according to the embodiments disclosed in commonly-owned, co-pending U.S. patent application Ser. No. 14/686,456, filed on Apr. 14, 2015, which claims benefit of priority to U.S. Provisional Application No. 62/083,696, filed on Nov. 24, 2014, and also to commonly-owned, co-pending U.S. patent application Ser. No. 14/686,561, filed on Apr. 14, 2015, which claims benefit of priority to U.S. Provisional Patent Application No. 62/083,732, filed on Nov. 24, 2014, all of which are hereby incorporated herein by reference.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a contact sensor provided at or near an air bearing surface of a slider and having a temperature coefficient of resistance, the contact sensor comprising a sensor element disposed between a pair of peripheral wings, the peripheral wings having a cross-sectional area larger than that of the sensor element and comprising the same material as the sensor element;
electrically conductive leads connected to the peripheral wings, the leads having a cross-sectional area larger than that of the peripheral wings; and
an electrically conductive overlay covering and contacting a portion of the peripheral wings and at least a portion of the leads.

2. The apparatus of claim 1, wherein the overlay is configured to increase a signal-to-noise ratio of the contact sensor relative to the contact sensor devoid of the overlay.

3. The apparatus of claim 1, wherein the overlay is spaced from the sensor element to avoid heat sinking the sensor element to the overlay.

4. The apparatus of claim 1, wherein:
the portion of the peripheral wings covered by the overlay has a first temperature profile when the contact sensor is biased and a second temperature profile when the contact sensor is unbiased; and
the first and second temperature profiles are substantially the same.

5. The apparatus of claim 1, wherein:
the portion of the peripheral wings covered by the overlay has a first temperature gradient when the contact sensor is biased and a second temperature gradient when the contact sensor is unbiased; and
the first and second temperature gradients are about zero.

6. The apparatus of claim 1, wherein the contact sensor is formed from a first electrically conductive material, and the leads are formed from a second electrically conductive material different from the first electrically conductive material.

7. The apparatus of claim 1, wherein the overlay is formed from the same material as the leads and peripheral wings and increases the cross-sectional area of the leads and peripheral wings.

8. The apparatus of claim 1, wherein:
the contact sensor has a first major surface and an opposing second major surface, the first and second major surfaces of the contact sensor extending from the air bearing surface into the slider;
each of the leads has a first major surface and an opposing second major surface, the first and second major surfaces of each of the leads extending from one of the peripheral wings into the slider;
the overlay is disposed on the first major surfaces of the contact sensor and the leads; and
the second major surfaces of the contact sensor and the leads are devoid of the overlay.

9. The apparatus of claim 1, wherein:
the contact sensor has a first major surface and an opposing second major surface, the first and second major surfaces of the contact sensor extending from the air bearing surface into the slider;

each of the leads has a first major surface and an opposing second major surface, the first and second major surfaces of each of the leads extending from one of the peripheral wings into the slider; and the overlay is disposed on the first and second major surfaces of the contact sensor and the leads.

10. The apparatus of claim 1, wherein the overlay is formed from a non-magnetic, high thermal conductivity, low resistivity material.

11. The apparatus of claim 1, wherein the peripheral wings form abutted junctions with the leads.

12. The apparatus of claim 1, further comprising a recording head configured for heat-assisted magnetic recording or interlaced magnetic recording, wherein the recording head comprises a plurality of contact sensor circuits each comprising the contact sensor, electrically conductive leads, and electrically conductive overlay.

13. An apparatus, comprising:
a contact sensor provided at or near an air bearing surface of a slider and having a temperature coefficient of resistance, the contact sensor coupled to an electrical lead arrangement comprising a first lead and a second lead, the contact sensor comprising:
a sensor element;
a first peripheral wing comprising an inner wing connected to the sensor element and an outer wing connected to the first lead; and
a second peripheral wing comprising an inner wing connected to the sensor element and an outer wing connected to the second lead, the first and second peripheral wings comprising the same material as the sensor element; and
an electrically conductive overlay covering and contacting at least the outer wings of the first and second peripheral wings and some or all of the first and second leads.

14. The apparatus of claim 13, wherein the overlay covers at least a portion of the inner wings of the first and second peripheral wings.

15. The apparatus of claim 13, wherein the overlay is configured to increase a signal-to-noise ratio of the contact sensor relative to the contact sensor devoid of the overlay.

16. The apparatus of claim 13, wherein the overlay is spaced from the sensor element to avoid heat sinking the sensor element to the overlay.

17. The apparatus of claim 13, wherein:
the outer wings have a first temperature profile when the contact sensor is biased and a second temperature profile when the contact sensor is unbiased; and the first and second temperature profiles are substantially the same.

18. The apparatus of claim 13, wherein:
the outer wings have a first temperature gradient when the contact sensor is biased and a second temperature gradient when the contact sensor is unbiased; and
the first and second temperature gradients are about zero.

19. The apparatus of claim 13, wherein:
the contact sensor has a first major surface and an opposing second major surface, the first and second major surfaces of the contact sensor extending from the air bearing surface into the slider;
each of the first and second leads has a first major surface and an opposing second major surface, the first and second major surfaces of the first and second leads respectively extending from the first and second peripheral wings into the slider;
the overlay is disposed on the first major surfaces of the contact sensor and the first and second leads; and
the second major surfaces of the contact sensor and the first and second leads are devoid of the overlay.

20. The apparatus of claim 13, wherein:
the contact sensor has a first major surface and an opposing second major surface, the first and second major surfaces of the contact sensor extending from the air bearing surface into the slider;
each of the first and second leads has a first major surface and an opposing second major surface, the first and second major surfaces of the first and second leads respectively extending from the first and second peripheral wings into the slider; and
the overlay is disposed on the first and second major surfaces of the contact sensor and the first and second leads.

21. The apparatus of claim 13, wherein the overlay is formed from a non-magnetic, high thermal conductivity, low resistivity material.

22. The apparatus of claim 13, wherein the overlay is formed from the same material as the leads and the outer wings, and increases the cross-sectional area of the first and second leads and the outer wings.

23. The apparatus of claim 13, wherein an abutted junction is defined between the first peripheral wing and the first lead and between the second peripheral wing and the second lead.

* * * * *